United States Patent
Dittmar et al.

(10) Patent No.: US 9,540,111 B2
(45) Date of Patent: Jan. 10, 2017

(54) INDIVIDUAL TEMPERATURE-CONTROL OF AIRCRAFT CABIN REGIONS BY HEATING AND EVAPORATIVE COOLING

(75) Inventors: Jan Dittmar, Buxtehude (DE); Christian Schumacher, Wedel (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 703 days.

(21) Appl. No.: 12/812,831

(22) PCT Filed: Jan. 12, 2009

(86) PCT No.: PCT/EP2009/000120
§ 371 (c)(1),
(2), (4) Date: Sep. 17, 2010

(87) PCT Pub. No.: WO2009/090026
PCT Pub. Date: Jul. 23, 2009

(65) Prior Publication Data
US 2011/0126562 A1    Jun. 2, 2011

Related U.S. Application Data

(60) Provisional application No. 61/021,362, filed on Jan. 16, 2008.

(30) Foreign Application Priority Data

Jan. 16, 2008  (DE) .................. 10 2008 004 695

(51) Int. Cl.
   *F25D 17/06*  (2006.01)
   *B64D 13/06*  (2006.01)
   *B64D 11/06*  (2006.01)
(52) U.S. Cl.
   CPC .......... *B64D 13/06* (2013.01); *B64D 11/0626* (2014.12); *B64D 2013/0662* (2013.01);
   (Continued)

(58) Field of Classification Search
   CPC ............ B64D 13/06; B64D 2013/0662; B64D 2013/0674; B64D 11/0626; Y02T 50/46; Y02T 50/44
   (Continued)

(56) References Cited

U.S. PATENT DOCUMENTS 2,562,918 A * 8/1951 Hynes ............................ 454/74
2,747,842 A * 5/1956 Shataloff ...................... 165/216
(Continued)

FOREIGN PATENT DOCUMENTS

CN    101155728 A    4/2008
DE   WO2005110844 A1 * 11/2005 ............. B64D 13/06
(Continued)

OTHER PUBLICATIONS

International Search Report for Appln. No. PCT/EP2009/000120 dated Apr. 28, 2009.
(Continued)

*Primary Examiner* — Larry Furdge
(74) *Attorney, Agent, or Firm* — Carter, DeLuca, Farrell & Schmidt, LLP (57) ABSTRACT

An air conditioning system for an aircraft for the individual air conditioning of regions of a cabin of an aircraft includes a central air conditioning device, which provides a pressurized and temperature-controlled central air flow. A part of the central air flow is supplied to a first cabin region. Another part of the central air flow is heated in a heating device or cooled in a cooling device and supplied to another cabin region. Water evaporates in the cooling device, in order to cool the air flow to be supplied to the cabin region.

11 Claims, 5 Drawing Sheets

(52) U.S. Cl.
 CPC ....... *B64D 2013/0674* (2013.01); *Y02T 50/44* (2013.01); *Y02T 50/46* (2013.01); *Y02T 50/56* (2013.01)

(58) Field of Classification Search
 USPC .............................................. 62/244, 90, 91
 See application file for complete search history.

(56) References Cited

U.S. PATENT DOCUMENTS

| | | | | |
|---|---|---|---|---|
| 2,851,254 | A * | 9/1958 | Messinger et al. | 165/235 |
| 2,979,916 | A * | 4/1961 | Mason | 62/172 |
| 4,261,416 | A * | 4/1981 | Hamamoto | 165/271 |
| 4,373,347 | A | 2/1983 | Howell et al. | |
| 4,434,624 | A * | 3/1984 | Cronin et al. | 62/172 |
| 5,037,585 | A | 8/1991 | Alix et al. | |
| 5,145,124 | A * | 9/1992 | Brunskill et al. | 244/118.5 |
| 5,513,500 | A * | 5/1996 | Fischer et al. | 62/239 |
| 5,524,848 | A * | 6/1996 | Ellsworth | 244/118.5 |
| 5,699,983 | A | 12/1997 | Ellsworth | |
| 6,003,327 | A | 12/1999 | Belding et al. | |
| 6,216,981 | B1 * | 4/2001 | Helm | 244/118.5 |
| 6,375,489 | B1 | 4/2002 | Roberts | |
| 7,188,480 | B2 * | 3/2007 | Korin | 62/92 |
| 2002/0078704 | A1 * | 6/2002 | Stich | 62/310 |
| 2002/0096312 | A1 * | 7/2002 | Korin | 165/58 |
| 2004/0089016 | A1 * | 5/2004 | Axe et al. | 62/402 |
| 2006/0161306 | A1 * | 7/2006 | Federspiel | 700/276 |

FOREIGN PATENT DOCUMENTS

| | | |
|---|---|---|
| DE | 10 2004 024 615 | 12/2005 |
| EP | 1 604 899 | 12/2005 |
| JP | 01-218999 | 1/1989 |
| RU | 2089791 C1 | 9/1997 |
| UA | 27489 U | 11/2007 |
| WO | WO 2005110844 A1 * | 11/2005 |
| WO | 2007087974 A1 | 8/2007 |

OTHER PUBLICATIONS

Japanese Office Action from corresponding Japanese Application No. 2010-542568 dated Apr. 23, 2013.

Chinese Office Action issued in corresponding application No. 200980102358.2 dated Dec. 26, 2012.

Russian Office Action issued in corresponding application No. 2010133171/11(046954) dated Nov. 27, 2012.

* cited by examiner

INDIVIDUAL TEMPERATURE-CONTROL OF AIRCRAFT CABIN REGIONS BY HEATING AND EVAPORATIVE COOLING

TECHNICAL FIELD

The present disclosure relates to the individual temperature-control of regions of a cabin of an aircraft by evaporative cooling and heating.

BACKGROUND

In the case of aircraft with a cabin divided into a plurality of regions, it is generally the desire to be able to all condition each region at a different temperature. For example, economy class can have a different temperature to business class. In a first-class suite the temperature can be individually settable. The temperature in business class is typically centrally preset. However, a passenger can individually set the temperature in the environment of his or her seat, so that the environment of the seat is supplied with colder or warmer air than the rest of the business class region. Through the individual air conditioning of regions of the cabin, it is also possible to take into account different heat loads in the regions.

Figure 5:
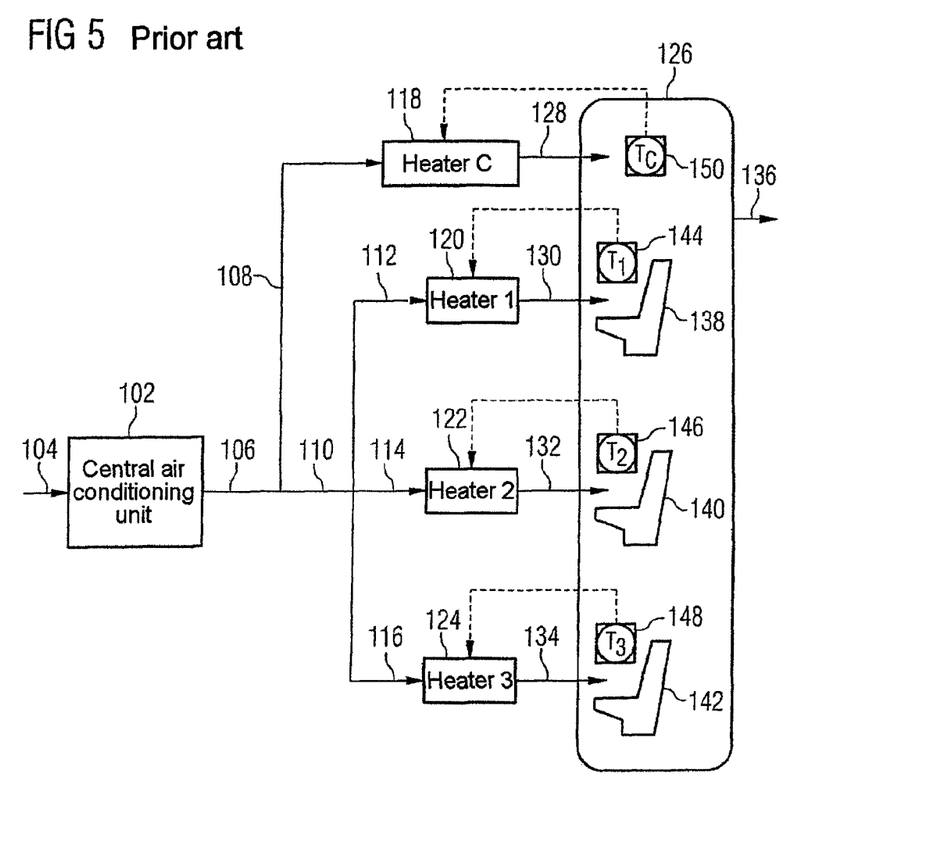
FIG. 5 shows an air conditioning system of the prior art.

FIG. 5 illustrates a conventional system for the air conditioning of sub-regions of an aircraft. A central air conditioning unit 102 is supplied with an air flow 104 which is put under a pressure higher than the pressure outside the cabin. Typically, the pressure is approximately 700 to 800 mbar, which corresponds approximately to a height of 2000 m to 3000 m above sea level. The air 104 to be supplied to the central air conditioning unit 102 can be, for example, air 136 recirculated from a cabin or engine bleed air. The central air conditioning unit 102 delivers an air flow 106 at a predetermined temperature. The air flow is distributed to a plurality of lines 108, 112, 114 and 116, where it is supplied to separate heating devices 118, 120, 122 and 124. From the cabin heating device 118 the air flow 128 is supplied to a cabin 126. From the first heating device 120 the air flow 130 is supplied to an environment of a first seat 138. The air flow 132 delivered by a second heating device 122 and the air flow 134 delivered by a third heating device 124 are supplied to a respective environment of a second seat 140 and a third seat 142. A temperature sensor 150 is provided in the cabin and a respective temperature sensor 144, 146 and 148 is arranged in the environment of the seats 138, 140 and 142. The temperature sensors 150, 144, 146 and 148 and a control device (not shown) control the assigned heating devices 118, 120, 122 and 124 in such a manner that air at a desired temperature is supplied to the cabin 126 or the regions of the seats 138, 140 and 142.

The central air conditioning unit 102 has to provide the air flow 106 at the temperature corresponding to the lowest temperature desired in the cabin 126 and the regions of the seats 138, 140 and 142. If a temperature substantially lower than the temperature desired in the cabin 126 is desired in one of the regions of the seats 13S, 140 and 142, the heating device 118 for the cabin has to expend a large amount of energy in order to bring the air flow 108 to the desired temperature. If the heating device 118 is an electrical heating device, this has to expend a relatively large amount of electrical energy. In an aircraft, loads which consume a large amount of electrical energy are undesirable since the electrical energy has to be obtained at relatively high cost and with relatively high losses from rotational energy of the turbines. Alternatively to this, the heating device 118 can have trim valves which supply the engine bleed air. However, this requires relatively large bleed air ducts which have to be routed through the cabin. This is undesirable since additional space is required for the bleed air ducts and the mass of the aircraft increases.

SUMMARY

The present disclosure provides an air conditioning system for an aircraft for the individual air conditioning of regions of a cabin of an aircraft, having a central air conditioning device which is designed to provide a central air flow having, in flight, a pressure lying above the air pressure outside the cabin and an actual temperature; a first supply line, which is designed to supply a part of the central air flow to a first cabin region, at least one branch line, which is designed to supply another part of the central air flow to at least one further cabin region, and a cooling device which cools the air flow in the at least one branch line if the actual temperature of to the air flow in the branch line is higher than the desired temperature of the air flow to be supplied to the respective further region, the cooling device being designed, for the cooling, to evaporate water into the air flow to be supplied to a region of the cabin.

A method for the individual air conditioning of a region of a cabin of an aircraft, of the present disclosure includes providing an air flow which, in flight, is pressurized to a pressure which is higher than the air pressure outside the cabin; temperature-controlling the pressurized air flow to an actual temperature; supplying the temperature-controlled air flow at the actual temperature to a first cabin region; providing the temperature-controlled air flow at the actual temperature to at least one further cabin region; and cooling the air flow provided to the at least one further cabin region by evaporating water before the air flow is supplied to the respective further cabin region if the desired temperature of the air flow to be supplied to the respective further cabin region is lower than the actual temperature.

BRIEF DESCRIPTION OF THE DRAWINGS

Various embodiments of the present disclosure will be described hereinbelow with reference to the figures wherein.

DETAILED DESCRIPTION

It is an object of the present disclosure to provide an improved air conditioning system for the individual air conditioning of regions of a cabin of an aircraft.

This object is achieved by an air conditioning system for an aircraft for the individual air conditioning of regions of a cabin of an aircraft, which system has a cooling device, in which water evaporates into an air flow having, in flight, a pressure lying above the air pressure outside the cabin, in order to cool an air flow to be supplied to a region of the cabin. The temperature of the air flow into which the water evaporates can be higher than the temperature outside the cabin. The water can evaporate into the air flow to be supplied to the region. The water can evaporate into an air flow which is not supplied to a region of a cabin of an aircraft.

The air conditioning system can be usable at any altitudes and at any outside temperatures. At the cruising altitude of a typical aircraft, outside temperatures of approximately −30° C. to approximately −50° C. prevail. Modern aircraft typically fly at a cruising altitude of approximately 9000 to approximately 11000 m. The pressure of the air flow for the cabin can be approximately 700 to approximately 800 mbar, which corresponds to a height of approximately 2000 m to 3000 in above sea level. However, the air can have any pressure at which a human being can breathe without additional breathing apparatus. The cooling device based on evaporative cooling can also be used at these cruising altitudes, since it is independent of the ambient temperatures outside the cabin.

In an aircraft, the air is relatively dry. The air can thus absorb a relatively large amount of water, with the result that relatively intense cooling is achieved.

The air flow to be supplied to a region of the cabin can be provided by a central air conditioning device. It is also possible for the air flow which is to be supplied to a region of the cabin to be removed from this region, cooled in the cooling device by the evaporative cooling and subsequently supplied to this cabin region again. It is also possible to provide a heating device which heats the air flow to be supplied to the region of the cabin if a heating and no cooling of the air flow is desired. The air flow to be supplied to the region of the cabin can be removed from the region by a fan and supplied to the region again after temperature-control.

The cooling device can be designed in such a manner that, for the cooling, water evaporates into the air flow to be supplied to the region of the cabin. This embodiment has the advantage that the air flow to be supplied to the cabin is humidified, which can increase the comfort of the passengers.

The object is also achieved by an air conditioning system for an aircraft for the individual air conditioning of regions of a cabin of an aircraft, which system has a central air conditioning device which provides a central air flow having, in flight, a pressure which is higher than the air pressure outside the cabin and an actual temperature of $T_{gactual}$. The air conditioning system comprises a first supply line, which is designed to supply a part of the central air flow to a first cabin region. A branch line of the air conditioning system is designed to divert another part of the central air (low for at least one further cabin region. The air conditioning system further comprises the above-described cooling device. The cooling device cools the air flow in the at least one branch line if the actual temperature $T_{gactual}$ of the air flow in the branch line is higher than the desired temperature $T_{z1desired}$, $T_{z2desired}$, $T_{z3desired}$ of the air flow to be supplied to the respective further region.

In embodiments, the air conditioning system further comprises a heating device. The heating device heats the air flow in the at least one branch line if the actual temperature $T_{gactual}$ of the air flow in the branch line is lower than the desired temperature $T_{z1desired}$, $T_{z2desired}$, $T_{z3desired}$ of the air flow to be supplied to the respective further region.

The branch line can supply a part of the central air flow to the cooling device. There can be connected to the cooling device a plurality of distributing lines which divide the air flow leaving the cooling device and supply a respective air flow to a heating device. There can be connected to the heating device a line which supplies the divided air flow to respectively one of a plurality of cabin regions. In this case, a part of the central air flow is supplied to a first cabin region. Another part of the central air flow is supplied to the cooling device, from where it is supplied to a plurality of heating devices. From each of the heating devices, a respective air flow is supplied to a further cabin region.

A plurality of branch lines can divert a part of the airflow from the central air conditioning device and supply a respective diverted air flow to a combination of heating device and cooling device. One of a plurality of cabin region supply lines supplies the respective air flow from the combination of heating device and cooling device to a cabin region. In this embodiment, in each supply line for a cabin region, a cooling device and a heating device can be arranged in series or parallel.

The first cabin region and the further cabin regions can be separate from one another. The further cabin regions can, however, also be situated at least partly in the first cabin region. The air delivered by the central air conditioning unit can always be supplied to the first cabin to region at the actual temperature $T_{gactual}$ without passing through a cooling device or a heating device. The heating devices can have a trim valve, by which engine bleed air is supplied. The heating devices can also be electrical heating devices. The central air conditioning device can use at least partly recirculated air and/or bleed air. Warm engine bleed air can be provided in an aircraft having a turbine with particularly low energy losses. The engine bleed air is compressed outside air which on compression heats up to a temperature which is higher than the temperature of an air flow to be supplied to a cabin region. Consequently, the engine bleed air has to be cooled, which leads to energy losses. Since the bleed air is usually taken from the engine compressor, energy in the form of thrust is lost. Alternatively, instead of bleed air, air compressed by an electrical compressor can be used, but this results in even higher energy losses.

Recirculated air can, or course, also be used, which involves particularly low energy losses. In this way, the central air conditioning device can provide warm and/or pressurized air with particularly low energy losses. The cabin air can also be recirculated if the volume of the air supplied from outside the cabin is not sufficient to achieve stable ventilation of the cabin.

The air conditioning system can further comprise a control device which controls the central air conditioning device in such a manner that the air delivered by it has an actual temperature $T_{gactual}$ which corresponds substantially to the desired temperature $T_{zedesired}$, $T_{z1desired}$, $T_{z2desired}$, $T_{z3desired}$ of the cabin region requiring the greatest air volume flow. As mentioned above, the central air conditioning device can provide warm air with a relatively low energy loss. Since the actual temperature $T_{gactual}$ of the air flow delivered by the central air conditioning device corresponds substantially to the desired temperature of the cabin region requiring the greatest air volume flow, the air conditioning system as a whole can be operated with a low power loss. As mentioned at the beginning, it is undesirable for engine bleed air to be supplied as trim air to the heating devices, since separate lines with a relatively large cross section and a valve are required for this. The additional lines and the valve increase the mass of the aircraft and are thus undesirable. Furthermore, local heating due to trim air involves safety problems and insulation problems owing to the high temperature of the trim air.

Electrical heating devices are preferred, since they do not require bleed air supply is lines. Thus, more space is available for other components of the aircraft. The electrical heating devices have the disadvantage that the electrical energy required for this can only be generated with a relatively high power loss. However, since the electrical heating devices only have to heat a relatively small air volume flow, the total energy consumption in the air conditioning system according to the present disclosure is lower than in the above-described air conditioning system of the prior art. An electrical heating device is easier to integrate, for example, into small sub-regions of the cabin and does not involve the above-mentioned safety risk of hot trim air.

The heating device can be a fuel cell.

The control or regulation of the air conditioning system in such a manner that the central air conditioning device delivers an air flow at an actual temperature $T_{gactual}$ which corresponds substantially to the desired temperature of the cabin region requiring the greatest air volume flow may be suboptimal from the energy point of view. That is to say, such a control or regulation might not result in the lowest total energy consumption when the energy losses are also taken into account. However, a simplified system architecture is thereby obtained, which has a lower weight, requires a smaller installation space and has a higher reliability. This system architecture may thus under certain circumstances be the more suitable design.

The control device can control the central air conditioning device, the at least one cooling device and the at least one heating device in such a manner that the total energy consumption of the air conditioning system is minimal. In the total energy consumption, the energy loss resulting during the provision of the warm air or the heating of air is taken into account. In this embodiment of the present disclosure, it may be required that each air flow can be cooled and heated, thus also the air flow to be supplied to the first region. Energy losses result, for example, from the conversion of rotational energy into electrical energy. Furthermore, energy losses result during the cooling of the engine bleed air at a temperature of approximately 150° C. to approximately 200° C. to a temperature suitable for the air conditioning of the aircraft cabin.

The air conditioning system does not necessarily provide the air flow, to be supplied to a region of the cabin, at the desired temperature of the air in the cabin, but at the temperature required to reach or maintain the desired temperature of the region. Depending on the heat load from the passengers and technical devices, for example electronic devices, the air to be supplied to a region lies between approximately 0° C. to approximately 10° C. below the desired temperature of the region.

The central air conditioning device can be a so-called pack. The pack is supplied with engine bleed air having the above-mentioned temperature of approximately 150° C. to approximately 200° C. The engine bleed air can be cooled by ram air. The engine bleed air can also pass through a plurality of expansion and/or compression cycles. The engine bleed air can also be cooled several times in heat exchangers, for example by ram air. The use of ram air increases the drag of the aircraft, i.e. the energy loss on air conditioning a region of the cabin. The air provided by the pack also serves as a heat sink for recirculated air. The temperature of the air flow provided by the pack usually depends on the cooling power required in a region of the cabin to which the air flow is supplied. Furthermore, the heat exchanger(s) in the pack increase the to mass of the aircraft and increase the pressure loss, for example owing to friction, in the ram air and in the air flow to be temperature-controlled by the pack.

Trim air is engine bleed air which is led past the pack, for example by a bypass valve, and thus the trim air is not cooled. The trim air can be provided, with lower energy losses, as the air provided by the pack, since no energy losses result from the cooling in the pack. However, the trim air also increases the amount of bleed air to be provided by the compressor of the turbine and thus also the loss of thrust.

The energy to be minimised comprises, for example, on the one hand, the energy expended on producing the hot engine bleed air, the energy expended on cooling the engine bleed air, and/or the energy expended on recirculating the cabin air. This is the energy required to provide warm air by the central air conditioning device. On the other hand, the energy to be minimised comprises the energy required for the evaporative cooling, for example the energy required for providing the water. Furthermore, the energy to be minimised comprises the energy required for the heating devices. In the case of an electrical heating device, the current consumed by the heating device and the energy loss resulting during the current generation are to be taken into account. In the case of a heating device with trim valves, the energy to be expended on producing the hot engine bleed air or trim air is to be taken into account.

The energy expended on producing the hot engine bleed air causes a loss of thrust. This arises due to the fact that the compressor of the engine sucks in outside air, compresses it and provides it to the air conditioning system. As described above, the hot engine bleed air can be provided to the pack and/or used as trim air. The energy balance to be minimised can also comprise the energy required for compressing the outside air to provide the bleed air. In this case, the losses in the pack owing to the heat exchangers and/or the expansion and compression cycles in the pack are also to be taken into account. Furthermore, the energy loss owing to the increased drag of the aircraft by using ram air can be taken into account. The weight of the water to be carried in order to cool the air flow to be supplied to the cabin can also be taken into account. In general, cold air can be provided as warm air only with relatively high energy losses.

If the desired temperature of the air flow to be supplied to a cabin region is lower than is the actual temperature of the air flow delivered by the central air conditioning device, the air flow can be cooled in the cooling device. This takes place by evaporation in order to consume as little energy as possible during the cooling. Conventional methods comprise the cooling of air by a coolant in a heat exchanger or the admixing of cold air in local mixers. The use of a coolant and a heat exchanger is relatively costly. Furthermore, energy losses result in this case owing to the efficiency of the heat exchangers and the cooling circuit. Since the coolant is conveyed in a circuit, an inflow line and an outflow line are required. The admixing of cold air in a local mixer requires an additional central air conditioning unit to produce the cold air. Furthermore, supply lines for the cold air to the local mixers are required, and these supply lines normally have to have a relatively large cross section.

Since water evaporates into the air flow in the cooling device, the cooling device causes no or relatively low energy losses. Since the total energy consumption including energy losses is also reduced by this, the higher technical outlay owing to the cooling devices can be justified. If the cabin region requiring the greatest air volume flow is predetermined, for example constructionally, on the basis of its size and/or its heat loads, the cooling device and the heating device in the cabin region air supply line for this cabin region can be dispensed with. As a result, the mass of the aircraft is reduced.

The cooling device can spray water into the air flow. The cooling device can nebulize water into the air flow by means of ultrasound. Water from a porous material can evaporate into the air flow in the cooling device. Furthermore, water can evaporate into the air flow on a membrane in the cooling device. For the cooling of the air flow to be supplied to the region of the cabin, it is also possible to use a bubble column in the water. For the evaporation, it is conceivable that water can be atomized by compressed air. To produce a latent heat of evaporation, a body wetted with water and having a large surface can be used. For the wetting, the body can move or rotate in a water bath or the body can be sprinkled or moistened with water.

The present disclosure also relates to a method for the individual air conditioning of a region of a cabin of an aircraft by cooling an air flow to be supplied to a region oldie cabin by evaporating water into an air flow which, in flight, is put under a pressure which is higher than the air pressure outside the cabin. The water can evaporate into the air flow supplied to the region of the cabin.

The pressure of the air flow can have the above-mentioned values of between approximately 700 to approximately 800 mbar. The method can be developed in the same way as the above-described air conditioning system.

The air flow can be removed, before cooling, from the cabin region to which it is supplied after cooling. If required, the removed air flow can be heated by a heating device before it is supplied to the cabin region again.

The method can have the following steps:
providing an air flow which, in flight, is pressurized to a pressure which is higher than the air pressure outside the cabin,
temperature-controlling the pressurized air flow to an actual temperature $T_{gactual}$,
supplying the temperature-controlled air flow at the actual temperature $T_{gactual}$ to a first cabin region,
providing the temperature-controlled air flow at the actual temperature $T_{gactual}$ to at least one further cabin region, and
cooling the air flow provided to the at least one further cabin region by evaporation before it is supplied to the respective further cabin region if the desired temperature $T_{z1desired}$, $T_{z2desired}$, $T_{z3desired}$ of the air flow to be supplied to the respective further region is lower than the actual temperature $T_{gactual}$.

The method can further comprise the heating of the air flow provided to the at least one further cabin region before it is supplied to the respective further cabin region if the desired temperature $T_{z1desired}$, $T_{z2desired}$, $T_{z3desired}$ of the air flow to be supplied to the respective further region is higher than the actual temperature $T_{gactual}$.

In a first embodiment, the method can temperature-control the temperature-controlled air flow at the actual temperature $T_{gactual}$, which is supplied to the further cabin regions, to the lowest desired temperature $T_{desiredmin}$ of all the desired temperatures $T_{z1desired}$, $T_{z2desired}$, $T_{z3desired}$ or the further regions. The air flow at the desired temperature $T_{desiredmin}$ is divided into a plurality of air flows which are assigned to a respective further cabin region. The divided air flows to be supplied to a respective further cabin region are heated to the respective desired temperature $T_{z1desired}$, $T_{z2desired}$, $T_{z3desired}$ if the desired temperature of the air flow to be supplied to the respective cabin region is higher than the lowest desired temperature $T_{desiredmin}$ of all the desired temperatures $T_{z1desired}$, $T_{z2desired}$, $T_{z3desired}$ of the further regions. In this embodiment, only one to cooling device which cools the air for the further regions is present.

In another embodiment, the temperature-controlled air flow is divided into a plurality of air flows which are supplied to a respective further cabin region. At least one temperature-controlled air flow at the actual temperature $T_{gactual}$, which is supplied to at least one further cabin region, is cooled to the desired temperature $T_{z1desired}$, $T_{z2desired}$, $T_{z3desired}$ of the air flow to be supplied to the respective further cabin region if the desired temperature of the air flow to be supplied to the respective further region is lower than the actual temperature $T_{gactual}$. At least one temperature-controlled air flow at the actual temperature $T_{gactual}$, which is supplied to at least one further cabin region, is heated to the desired temperature $T_{z1desired}$, $T_{z2desired}$, $T_{z3desired}$ of the air flow to be supplied to the further cabin region if the desired temperature of the air flow to be supplied to the respective further region is higher than the actual temperature $T_{gactual}$. The air to be supplied to the further regions is first divided and then, as described above, cooled or heated, according to the particular case. In both embodiments, the further regions can be situated separately from the first cabin region. The further regions can also be sub-regions of the first cabin region.

The actual temperature $T_{gactual}$ of the pressurized air flow can correspond substantially to the desired temperature $T_{zedesired}$, $T_{z1desired}$, $T_{z2desired}$, $T_{z3desired}$ of the cabin region requiring the greatest air volume flow. As mentioned above, the energy consumption and in particular the energy losses can thereby be reduced. The actual temperature $T_{gactual}$ of the pressurized air flow can be substantially selected such that the total energy consumption is minimal. In the total energy consumption, the energy loss resulting during the provision of warm air, heating of air and cooling of air is taken into account. In this embodiment of the present disclosure, it may be to required that each air flow can be cooled and heated, thus also the air flow to be supplied to the first region.

The present disclosure also relates to the use of water, which evaporates into an air flow supplied to a cabin of an aircraft, for cooling the air flow supplied to the cabin. The air flow can be provided by the above-described central air conditioning device and have a pressure higher than the pressure outside the cabin. The cooled air flow can be supplied to one or more regions of a cabin. The cooled air flow can be supplied to a cabin with only one region. The cooled air can, as described above, be used for the air conditioning of regions of the cabin of an aircraft.

The present disclosure will now be described in more detail with reference to the appended drawings.

A cabin of an aircraft is usually divided into a plurality of regions which are considered as zones at an individual desired temperature. Each zone can comprise its own temperature regulation or temperature control. The desired temperatures of the regions usually differ only slightly. However, the heat loads in the regions can differ greatly owing, for example, to the passenger density and the number of appliances emitting waste heat. The desired temperatures of the air jet to be supplied to a region are dependent on the heat loads in the respective region and consequently differ greatly. Regions with high heat loads accordingly require that air be supplied at a lower desired temperature.

Figure 1:
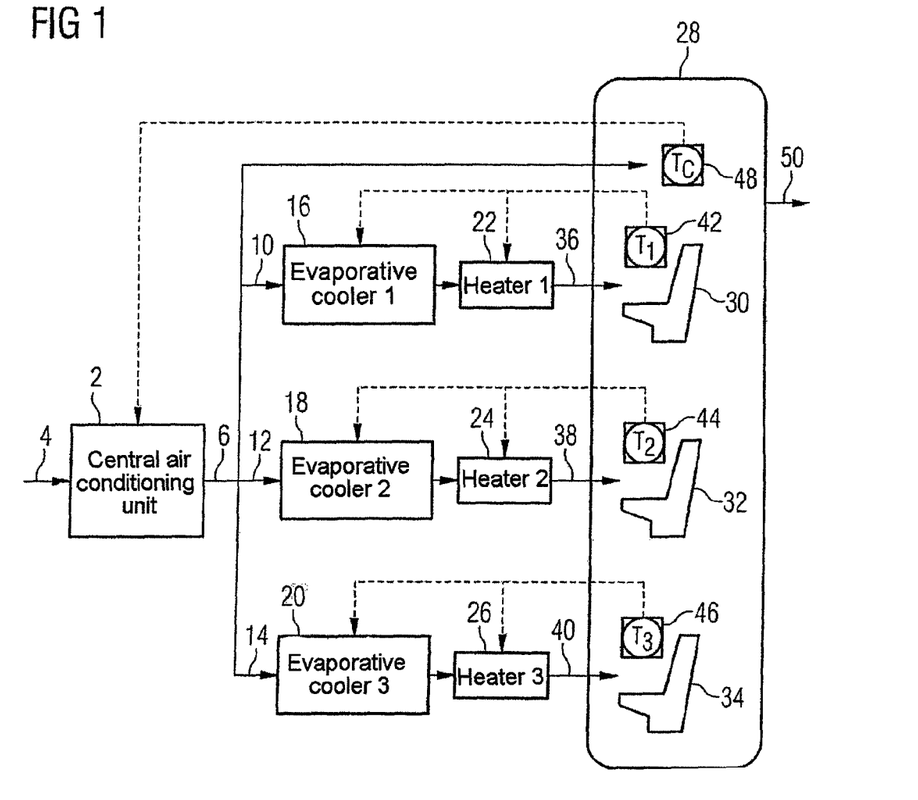
FIG. 1 shows an embodiment of the air conditioning system in which air is supplied to the region requiring the greatest air volume flow directly from a central air conditioning device, and each supply line to a further region has a cooling device and a heating device.

FIG. 1 shows an embodiment of the present disclosure in which air is supplied to the cabin region requiring the greatest air volume flow directly from a central air conditioning device 2 without being cooled or heated by an additional cooling device or heating device. An air flow 4 which can comprise engine bleed air and/or air 50 recirculated from a cabin 28 is supplied to a central air conditioning device 2. On leaving the central air conditioning device 2, the air flow 6 has a higher air pressure than the air outside the cabin. The air flow 6 is supplied into the cabin 28 via a first cabin supply line. In the cabin there are further regions, to be individually air conditioned, which constitute the environment of a respective seat 30, 32 and 34. The air flow 6 is supplied by a second supply line 10 to a first cooling device 16 and a first heating device 22 before entering the environment of the first seat 30 as an individually air conditioned air flow 36. Individually air conditioned air is likewise supplied to the second seat 32 and the third seat 34 via a respective supply line 12 and 14, a respective cooling device 18 and 20 and a respective heating device 24 and 26. The heating device and cooling device assigned to a supply line can be arranged in series or parallel.

In the cooling device water evaporates into the air flow running through the cooling device. In the cooling device the water can be sprayed into the air flow through a nozzle. The nozzle can be an ultrasonic nozzle. Alternatively to this, a water mist can be produced by ultrasound. In this case, a mist is produced above a water surface by ultrasound and its droplets evaporate in the air flow. Furthermore, water contained in a porous material or a fill can evaporate into the air flow. A carrier material with a large surface is wetted with water which evaporates from the surface into the air flow. The evaporation can also take place through a membrane. In this case, the water evaporates from the liquid state from one sidle of the membrane into the air flow on the other side of the membrane. For the cooling of the air flow to be supplied to the region of the cabin, it is also possible to use a bubble column in the water. For the evaporation, it is conceivable that water can be atomized by compressed air. To produce a latent heat of evaporation, a body with a large surface wetted with water can be used. For the wetting, the body can move or rotate in a water bath or the body can be sprinkled or moistened with water. It is also conceivable for the evaporation to take place on a heat transfer surface. In this case, water is evaporated in an air-to-air heat exchanger on a heat transfer surface in the first of two air flows. As a result, this air flow is humidified and consequently cooled. Additionally, owing to the heat transfer surface, heat is extracted from the second air flow without increasing the water load thereof. This second air flow can be supplied to a cabin region.

The water required for the evaporation in the cooling devices 16, 18, 20 can be stored in tanks which can be filled, and/or condensation water from any air conditioning device in the aircraft can be collected. If the water for the cooling cannot be obtained or recovered on board, it has to be carried, which increases the weight and takes up space. This also results in an energy loss which can be taken into account. The water could also come from one or more fuel cells, for example after the condensation of the fuel cell exhaust gas on the cold outer skin of the aircraft. The water can also be obtained by condensation of air, for example air leaving the cabin, on the cold outer skin of the aircraft.

In this embodiment, the cabin 28 requires the greatest air volume flow. A first temperature sensor 48 measures the actual temperature $T_{eactual}$ in the cabin 28. A control device (not shown) compares the actual temperature $T_{eactual}$ with the desired temperature $T_{edesired}$ in the cabin 28. From this, the control device calculates the desired temperature $T_{zedesired}$ of the air flow to be supplied into the cabin 28 via the first supply line S. The central air conditioning device 2 is controlled in such a manner that the actual temperature $T_{gactual}$ of the air flow delivered by it corresponds substantially to the desired temperature $T_{zedesired}$ of the air flow to be supplied to the cabin 28.

Recirculated air 50 and/or engine bleed air can be supplied to the central air conditioning device 2. These warm-air sources can provide the warm air with a particularly low energy loss. The air conditioning systems of the prior art also have an electrical heating device in to the line to the cabin region requiring the greatest air volume flow. Electrical energy can be generated in an aircraft only with a relatively high energy loss. Consequently, the air conditioning, system according to the present disclosure requires less energy overall than an air conditioning system of the prior art.

In the embodiment according to FIG. 1, a second cabin region is situated in the environment of the first seat 30, a third cabin region is situated in the environment of the second seat 32 and a fourth cabin region is situated in the environment of the third seat 34. The second, third and fourth cabin region can, however, also be situated separately from the first cabin region 28.

In the environment of the first seat 30 the actual temperature $T_{1actual}$ is detected by a second temperature sensor 42, in the environment of the second seat 32 the actual temperature $T_{2actual}$ is detected by a third temperature sensor 44, and in the environment of the third seat 34 the actual temperature $T_{3actual}$ is detected by a fourth temperature sensor 46. The environment of the first seat 30 is assigned the desired temperature $T_{1desired}$, the environment of the second seat 32 is assigned the desired temperature $T_{2desired}$ and the environment of the third seat 34 is assigned the desired temperature $T_{3desired}$. The desired temperatures in the environment of the seats 30, 32 and 34 can be preset centrally or individually for each seat, for example by a setting device fitted in the seat.

The environment of the first seat 30 is assigned the first cooling device 16 and the first heating device 22. Air is supplied to the cooling device 16 and the heating device 22 via a first branch line 10 and enters the environment of the first seat 30 via a second supply line 36. From the actual temperature $T_{1actual}$ and the desired temperature $T_{1desired}$ of the environment of the first seat 30 which are detected by the second temperature sensor 42, a control device (not shown) determines the desired temperature $T_{z1desired}$ of the air flow entering the environment of the first seat 30 from the second supply line 36. The air in the first branch line 10 has the actual temperature $T_{gactual}$. If the actual temperature $T_{gactual}$ is higher than the desired temperature $T_{z1desired}$ of the air flow in the second supply line 36, the first cooling device 16 cools the air flow to the desired temperature $T_{z1desired}$. If the actual temperature $T_{gactual}$ is lower than the desired temperature of the air flow in the second supply line 36, the first heating device 22 heats the air flow to the desired temperature $T_{z1desired}$. The control of the first cooling device 16 and the first heating device 22, based on the actual temperature $T_{gactual}$ of the air flow delivered by the central air conditioning device 2, the desired temperature $T_{z1desired}$ of the air flow to be supplied to the environment of the first seat 30, and the actual temperature $T_{1actual}$ and the desired temperature $T_{1desired}$ in the environment of the first seat 30, can be effected by a decentralised control device. This is desirable particularly in the case of large aircraft. It is, however, also conceivable for the central air conditioning device 2, the first cooling device 16 and the first heating device 22 to be controlled by a common control device.

The control of the temperature of the air flow flowing into the environment of the second seat 32 from the third supply line 38 is effected in the same manner as described above in connection with the environment of the first seat 30. For this purpose, from the actual temperature $T_{2actual}$ and the desired temperature $T_{2desired}$ of the environment of the second seat 32 which are detected by the third temperature sensor 44, a control device determines the desired temperature $T_{z2desired}$ of the air flow entering the environment of the second seat 32 from the third supply line 38. The control device controls the second cooling device 18 and the second heating device 24 in such a manner that the air flow delivered by the central air conditioning device 2 at the actual temperature $T_{gactual}$ is temperature-controlled to the desired temperature $T_{z2desired}$ of the air flow to to be supplied to the environment of the second seat 32.

The control of the temperature of the air flow flowing into the environment of the third seat 34 from the fourth supply line 40 is effected in the same manner as described above in connection with the environment of the first seat 30 and second seat 32. From the actual temperature $T_{3actual}$ and the desired temperature $T_{3desired}$ of the environment of the third seat 34 which are detected by the fourth temperature sensor 46, a control device determines the desired temperature $T_{z3desired}$ of the air flow entering the environment of the third seat 34 from the fourth supply line 40. The control device controls the third cooling device 20 and the third heating device 26 in such a manner that the air flow delivered by the central air conditioning device 2 at the actual temperature $T_{gactual}$ is temperature-controlled to the desired temperature $T_{z3desired}$ of the air flow to be supplied to the environment of the third seat 34.

The control of the second cooling device 18 and the second heating device 24 can also be effected autonomously or in a decentralised manner. Likewise, the control of the third cooling device 20 and the third heating device 26 can be effected autonomously or in a decentralised manner. It is also conceivable for a control device to control a plurality of or all of the cooling devices and heating devices. A control device which controls the central air conditioning device 2 and all of the cooling devices and heating devices can also be provided.

In the context of this application, control is also intended to embrace regulation with a closed control loop. In each region, the desired temperature can be locally influenced. The regulation can be carried out for each region via sensors in the cabin. For local air conditioning, for example air conditioning of an environment of a seat, control on the basis of human perception is also suitable. It is in this case possible to directly set the desired value of the temperature of the air flow to be supplied to the region and/or directly set the heating/cooling power.

Figure 2:
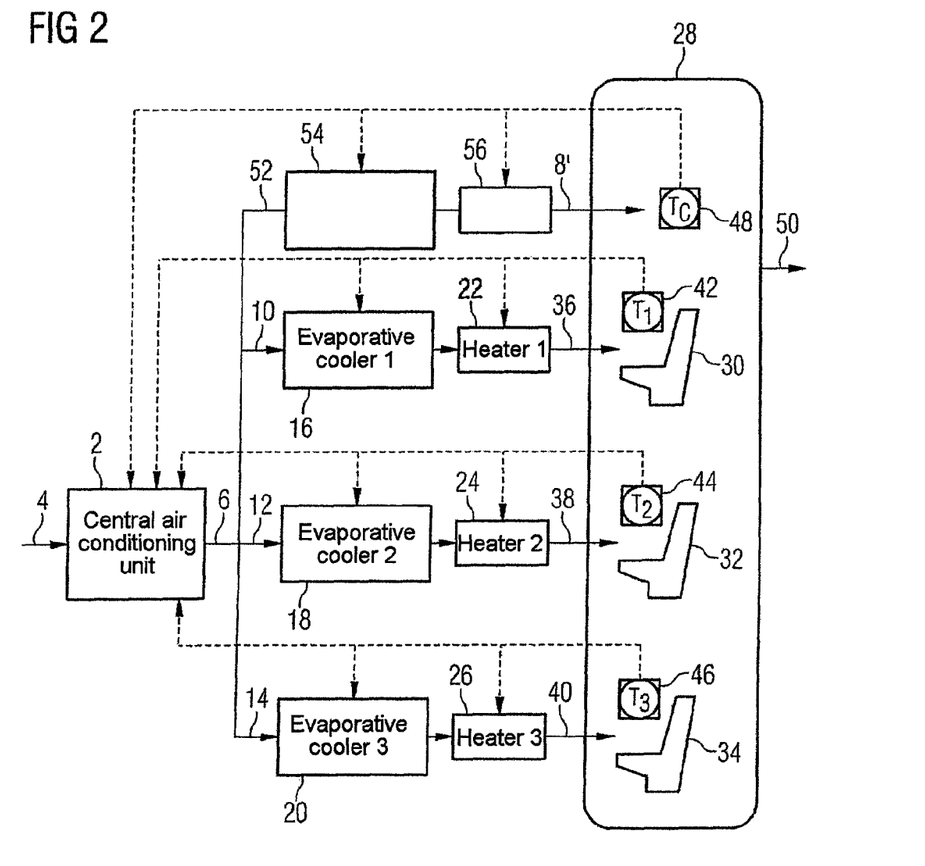
FIG. 2 shows an embodiment in which each supply line to a region of the cabin has a cooling device and a heating device.

FIG. 2 shows a second embodiment of the present disclosure. The structure and functioning of the second embodiment correspond substantially to those of the first embodiment. Identical or similar components are denoted by the same reference symbols as in FIG. 1. In addition to the first embodiment, the second embodiment comprises a cabin air cooling device 54 and a cabin air heating device 56. A cabin air branch line 52 supplies air from a central air conditioning device 2 at the actual temperature $T_{gactual}$ to the cabin air cooling device 54 and the cabin air heating device 56. If the actual temperature $T_{gactual}$ of the air delivered by the central air conditioning device 2 is higher than the desired temperature $T_{zedesired}$ of the air flow to be supplied by the first supply line S' into the cabin 28, a control device (not shown) controls the cabin air cooling device 54 in such a manner that it cools the air flow, to be supplied by the central air conditioning device 2, to the desired temperature $T_{zedesired}$.

If the actual temperature $T_{gactual}$ of the air delivered by the central air conditioning device 2 is lower than the desired temperature $T_{zedesired}$ of the air flow to be supplied to the cabin 28, the cabin air heating device 56 heats the air flow to the desired temperature $T_{zedesired}$. In this case, it is possible to select the actual temperature $T_{gactual}$ of the air delivered by the central air conditioning device such that the total energy consumption of the air conditioning system is minimised. This is particularly useful when the individual cabin regions require similar air volume flows. In this case, the control device controls the central air conditioning device 2, the cooling devices 16, 18, 20, the cabin air cooling device 54, the heating devices 22, 24, 26 and the cabin air heating device 56. The heating device or cabin heating device and cooling device or cabin cooling device assigned to a supply line can be arranged in series or parallel.

As mentioned above, the energy to be minimised comprises, for example, on the one to hand, the energy expended on producing the hot engine bleed air, the energy expended on cooling the engine bleed air, and/or the energy expended on recirculating the cabin air. This is the energy required to provide warm air by the central air conditioning device. On the other hand, the energy to be minimised comprises the energy required for the evaporative cooling, for example the energy required for providing the water. Furthermore, the energy to be minimised comprises the energy required for the heating devices. In the case of an electrical heating device, the current consumed by the heating device and the energy loss resulting during the current generation are to be taken into account. In the case of a heating device with trim valves, the energy expended on producing the hot engine bleed air or trim air is to be taken into account. If the trim air removed reduces the amount of bleed air supplied to the pack, it can also be taken into account that the energy loss in the pack is reduced, because less bleed air has to be cooled in the pack.

As mentioned above, the energy expended on producing the hot engine bleed air causes a loss of thrust. This arises due to the fact that the compressor of the engine sucks in outside air, compresses it and provides it to the air conditioning system. As described above, the hot engine bleed air can be provided to the pack and/or used as trim air. The energy balance to be minimised can also comprise the energy required for compressing the outside air to provide the bleed air. The losses in the pack owing to the heat exchangers and/or the expansion and compression cycles in the pack are also to be taken into account. Furthermore, the energy loss owing to the increased drag of the aircraft by using ram air can be taken into account. The weight of the water to be carried in order to cool the air flow to be supplied to the cabin can also be taken into account. In general, cold air can be provided as warm air only with relatively high energy losses.

Since the air conditioning system according to the present disclosure can cool the air without or virtually without power loss, and a heating device, if it is electrically operated, causes relatively high energy losses owing to the energy losses during the generation of the electric current, it can be expedient to set the actual temperature $T_{gactual}$ to the highest desired temperature of the air flows to be supplied to the cabin regions. This is particularly expedient if one cabin region requires only a slightly higher temperature than the other cabin regions. The air to be supplied to the other cabin regions can be cooled by the evaporative cooling. As mentioned above, the central air conditioning device 2 can provide warm air with a relatively low energy loss if, for example, recirculated air 50 or engine bleed air is used. The actual temperature $T_{gactual}$ of the air flow delivered by the central air conditioning device 2 can be set to any temperature lying between the lowest and the highest of the desired temperatures of the air flows to be supplied to the cabin regions.

Figure 3:
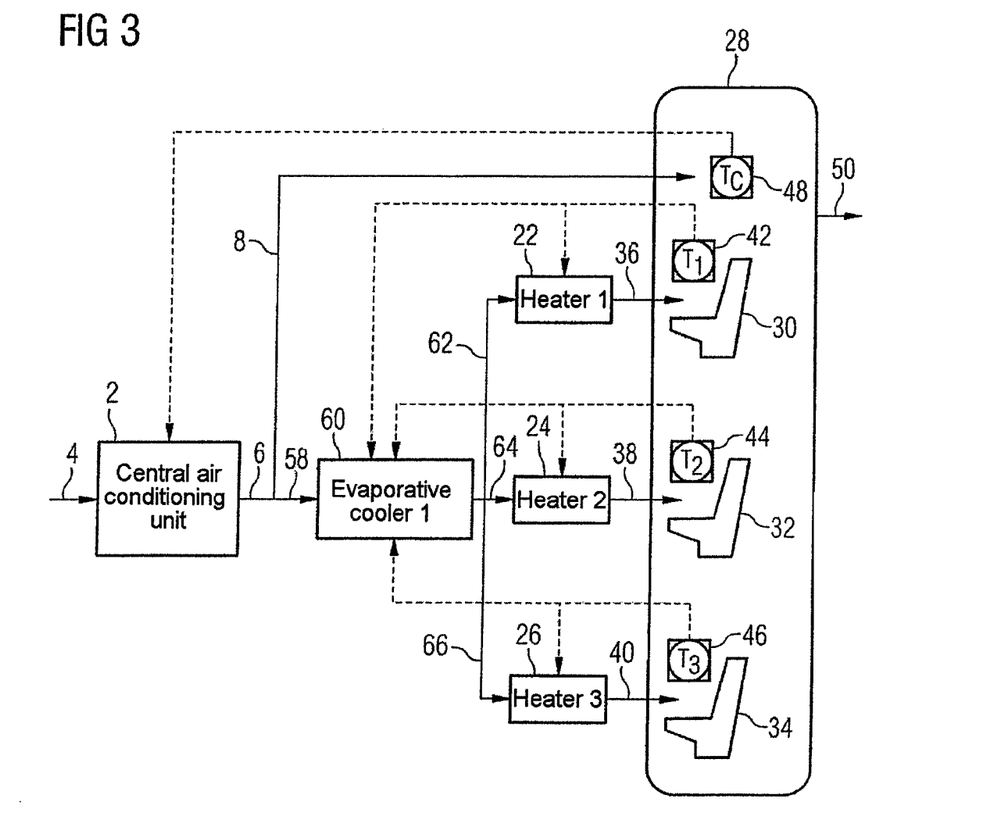
FIG. 3 shows an embodiment in which air flows supplied to the further regions are cooled by a common cooling device.

FIG. 3 shows a third embodiment of the present disclosure. The third embodiment differs from the first embodiment according to FIG. 1 in that an air flow diverted from a first line 6 into a common branch line 58 is supplied to a central cooling device 60. From the central cooling device 60, an air flow is supplied via a first distributing line 62 to a first heating device 22, from where it is supplied via a second supply line to the environment of a first seat 30. Via a second distributing line 64, a part of the air flow is supplied from the central cooling device 60 to a second heating device 24, from where it is supplied via a third supply line 38 to the environment of a second seat 32. Another part of the air flow from the central cooling device 60 is supplied via a third distributing line 66 to a third heating device 26, from where it is supplied via a fourth supply line 40 to the environment of a third seat 34. The control of the actual temperature $T_{gactual}$ of the air flow delivered by the central air conditioning device 2 is effected as described under the first embodiment according to FIG. 1.

The actual temperature $T_{gactual}$ of the air flow delivered by the central air conditioning device 2 thus corresponds to the desired temperature $T_{zedesired}$ of the cabin 28. Preferably, the actual temperature $T_{gactual}$ of the air flow delivered by the central air conditioning device 2 corresponds substantially to the desired temperature of the cabin region requiring the greatest air volume flow.

A second temperature sensor 42 detects the actual temperature $T_{1actual}$ in the environment of the first seat 30, a third temperature sensor 44 detects the actual temperature $T_{2actual}$ in the environment of the second seat 32, and a fourth temperature sensor 46 detects the actual temperature $T_{3actual}$ in the environment of the third seat 34. A control device (not shown) compares the actual temperatures $T_{1actual}$, $T_{2actual}$ and $T_{3actual}$ with the desired temperatures $T_{1desired}$, $T_{2desired}$ and $T_{3desired}$ of the environments of the seats 30, 32 and 34 and calculates therefrom the desired temperature $T_{z1desired}$ of the air flow to be supplied to the environment of the first seat 30, the desired temperature $T_{z2desired}$ of the air flow to be supplied to the environment of the second seat 32, and the desired temperature $T_{z3desired}$ of the air flow to be supplied to the environment of the third seat 34.

If a desired temperature $T_{z1desired}$, $T_{z2desired}$, $T_{z3desired}$ is lower than the actual temperature $T_{gactual}$ of the air flow delivered by the central air conditioning device 2, the central air cooling device 60 cools the air flow delivered by the central branch line 58 to the lowest of the desired temperatures $T_{z1desired}$, $T_{z2desired}$, $T_{z3desired}$ of the air flows to be supplied to the environments of the seats 30, 32, 34. If the actual temperature of the air flow leaving the central cooling device 60 corresponds to the desired temperature of an air flow to be supplied into an environment of a seat, the corresponding heating device does not have to heat the air flow. If, for example, the actual temperature of the air flow delivered by the central cooling device 60 corresponds to the desired temperature $T_{z1desired}$ of the air flow to be supplied to the environment of the first seat 30, the first heating device 22 thus does not have to heat the air flow.

If the desired temperature of an air flow to be supplied to an environment of a seat is higher than the actual temperature of the air flow delivered by the central cooling device 60, the heating device assigned to this air flow does not have to heat the air flow to the desired temperature of the corresponding air flow. If, for example, the desired temperature $T_{z2desired}$ of the air flow to be supplied to the environment of the second seat 32 is higher than the actual temperature of the air flow delivered by the central cooling device 60, the second heating device 24 does not have to heat the air flow delivered by second distributing line 64 to the desired temperature $T_{z2desired}$.

This embodiment is particularly suitable for aircraft in which a plurality of small regions, for example environments of seats, have to be supplied with cool air.

Figure 4:
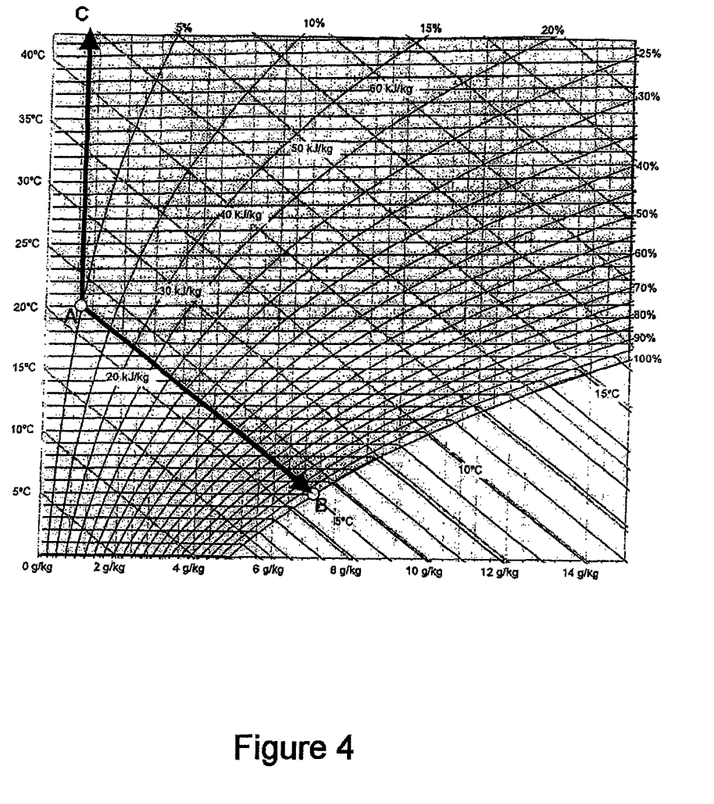
FIG. 4 shows a Mollier h-x diagram.

FIG. 4 illustrates a Mollier h-x diagram at an air pressure of approximately 782 hPa, corresponding to a height of 7000 feet (approximately 2134 in) above sea level. Point A in this diagram represents air supplied to an evaporative cooling device at 20° C. and 5% relative humidity. This corresponds approximately to the requirements demanded of individually adjustable ventilation in the business class of an aircraft at cruising altitude. Point B marks the point with the lowest temperature attainable by evaporative cooling, i.e. approximately 5° C. The ray leading from point A towards point C represents the temperature together with the relative air humidity attainable by heating. When using an evaporative cooling method, the maximum relative air humidity of 100% in an aircraft must not be reached, since this would lead to to considerable condensation on cool surfaces and consequently to corrosion. At a realistic maximum humidity of 50% at the air outlet, the air flow in the example given here can be cooled from approximately 20° C. to approximately 10° C.

The method according to the present disclosure and the air conditioning system according to the present disclosure provide controllable or regulable cooling and heating of local air flows. Through control of the central air conditioning device based on the desired temperature of the air flows to be supplied to the individual cabin regions, the energy requirement of the air conditioning system can be minimised when the energy loss, which occurs for example during the heating or cooling of air, is also taken into account. The water supply lines to the cooling devices with the evaporative cooling have a small space requirement compared with a cold air supply line or the forward and return line which would be necessary in the case of cooling by a circulating coolant. Since water is present on board an aircraft, no additional coolant is required. Preferably, condensation water can be used for the evaporation in the cooling devices, since the condensation water on a cold surface, for example in an evaporator for a coolant or on the aircraft outer skin, can be collected and the condensation water contains substantially no lime, salts or other dissolved substances. A small space requirement for the cooling device(s) can result. The energy requirement for cooling the air flow is reduced, since only water has to be provided and atomized. The cooling by evaporation has a low dead time or time constant. Through the local increase of the air humidity, the comfort of a passenger is increased; in particular on long-distance flights. The evaporative cooling can be used both for the air conditioning of the cabin or a cabin region. The evaporative cooling can also be used for local air conditioning, for example for the air conditioning of the environment of a seat.

A further advantage of the present disclosure is that each region is supplied with fresh to air, i.e. air which has been conditioned in the central air conditioning device. As a result, the comfort of the passenger is also increased.

What is claimed is:

1. An air conditioning system for an aircraft for the individual air conditioning of regions of a cabin of the aircraft, comprising:
 a central air conditioning device which is designed to provide a central air flow having, in flight, a pressure lying above the air pressure outside the cabin and an actual temperature, wherein the central air conditioning device is supplied with an air flow comprising engine bleed air and/or air recirculated from the cabin of the aircraft;
 a first supply line, which is designed to supply a part of the central air flow into the cabin, wherein the cabin includes a first temperature sensor for measuring the temperature in the cabin;
 at least one branch line, which is designed to supply another part of the central air flow to further cabin regions, each of which is to be individually air conditioned and constitutes the environment of a respective seat in the cabin, wherein each environment of a seat is provided with a temperature sensor for measuring the actual temperature of the environment of the seat;
 a cooling device which is connected to the central air conditioning device via the branch line, wherein the cooling device cools the air flow in the at least one branch line if the actual temperature of the air flow in the branch line is higher than a desired temperature of an air flow to be supplied to the respective environment of a seat, the cooling device being designed, for the cooling, to evaporate water into the air flow to be supplied to the respective further environment of a seat; and
 a plurality of heating devices which heat the air flow in the at least one branch line if the actual temperature of the air flow is lower than the desired temperature of the air flow to be supplied to the respective environment of a seat,
 wherein the at least one branch line supplies a part of the central air flow provided by the central air conditioning device to the cooling device,
 wherein the cooling device is connected to a plurality of distributing lines which divide the air flow leaving the cooling device,
 wherein each of the distributing lines is connected to a respective one of the plurality of heating devices, to supply a respective divided air flow to the heating device,
 wherein at least one supply line is connected to the heating device, which supply line supplies the air flow to a respective environment of a seat, and
 wherein a control device is configured to control the central air conditioning device, the cooling device, and at least one of the plurality of heating devices in such a manner that the total energy consumption of the air conditioning system is minimal, wherein the control device compares the actual temperatures of the environments of the seats with the desired temperatures of the environments of the seats and calculates therefrom the desired temperature of the air flow to be supplied to the environment of the respective seat.

2. The air conditioning system according to claim 1, further comprising a control device which is designed to control the cooling device, based on a measured actual temperature, in such a manner that the air flow in the at least one branch line is cooled to the desired temperature of the air flow to be supplied to the respective region.

3. The air conditioning system according to claim 1, wherein a control device controls the central air conditioning device in such a manner that the air delivered by the control device has an actual temperature which corresponds to the desired temperature of the cabin region requiring the greatest air volume flow.

4. The air conditioning system according to claim 1, wherein the cooling device sprays water into the air flow, nebulizes water into the air flow by ultrasound and/or atomizes water into the air flow by compressed air.

5. The air conditioning system according to claim 1, wherein the cooling device is designed in such a manner that the air flow to be supplied to the cabin region passes through a bubble column.

6. The air conditioning system according to claim 1, wherein the cooling device is designed in such a manner that water contained in a porous material evaporates into the air flow and/or water on a body with a large surface.

7. The air conditioning system according to claim 1, wherein the cooling device is designed in such a manner that water evaporates into the air flow on a membrane.

8. A method for the individual air conditioning of a region of a cabin of an aircraft, comprising:
 providing an air flow by means of a central air conditioning device which, in flight, is pressurized to a pressure which is higher than the air pressure outside the cabin;
 temperature-controlling the pressurized air flow to an actual temperature;
 supplying the temperature-controlled air flow at the actual temperature to the cabin;
 providing the temperature-controlled air flow at the actual temperature to further cabin regions, each of which is to be individually air conditioned and constitutes the environment of a respective seat in the cabin, wherein each environment of a seat is provided with a temperature sensor for measuring the actual temperature of the environment of a seat;
 providing at least one cooling device with the temperature-controlled air flow of the central air conditioning device via a branch line;
 cooling the temperature-controlled air flow provided to the further environments of a seat, via a cooling device, by evaporating water before an air flow is supplied to the respective environment of a seat if a desired temperature of the air flow to be supplied to the respective environment of a seat is lower than the actual temperature;
 heating, via at least one heating device, the air flow provided to the further environments of a seat before the air flow is supplied to the respective environments of seats if the desired temperature of the air flow to be supplied to the respective environment of a seat is higher than the actual temperature;
 cooling the temperature-controlled air flow at the actual temperature, which is supplied to the environments of seats, to the lowest desired temperature of all the desired temperatures of the further environments of seats;
 dividing the air flow at the desired temperature into a plurality of air flows which are assigned to a respective environment of a seat;
 heating the divided air flows to be supplied to the respective environments of seats to the respective desired temperature if the desired temperature of the air flow to be supplied to the respective environment of a seat is higher than the lowest desired temperature of all the desired temperatures of the further zones; and controlling, by means of a control device, the central air conditioning device, the cooling device, and the at least one heating device in such a manner that the total energy consumption of the air conditioning system is minimal.

9. The method according to claim 8, further comprising: controlling the cooling of the air flow supplied to the respective environment of a seat, based on a measured actual temperature, in such a manner that this air flow enters this environment of a sea at the desired temperature of the air flow to be supplied to this environment of a seat.

10. The method according to claim 8, further comprising: removing air from the cabin to which the air flow is to be supplied, the removed air flow being cooled before it is supplied to the cabin again.

11. An air conditioning system for an aircraft for the individual air conditioning of regions of a cabin of the aircraft, comprising:

a central air conditioning device which is designed to provide a central air flow having, in flight, a pressure lying above the air pressure outside the cabin and an actual temperature, wherein the central air conditioning device is supplied with an air flow comprising engine bleed air and/or air recirculated from the cabin of the aircraft;

a first supply line, which is designed to supply a part of the central air flow to the cabin, wherein the cabin includes a first temperature sensor for measuring the temperature in the cabin;

at least one branch line, which is designed to supply another part of the central air flow to at least one further cabin regions, each of which is to be individually air conditioned and constitutes the environment of a respective seat in the aircraft cabin, wherein each environment of a seat is provided with a temperature sensor for measuring the actual temperature of the environment of a seat;

a cooling device which cools the air flow in the at least one branch line if the actual temperature of the air flow in the branch line is higher than a desired temperature of an air flow to be supplied to the respective environment of a seat, the cooling device being designed, for the cooling, to evaporate water into the air flow to be supplied to the respective environment of a seat;

a heating device which heats the air flow in the at least one branch line if the actual temperature of the air flow is lower than the desired temperature of the air flow to be supplied to the respective environment of a seat;

a plurality of branch lines, which divert a part of the air flow from the central air conditioning device, wherein each of the plurality of branch lines connects the central air conditioning device to a cooling device of a combination of heating device and cooling device, to supply a respective diverted air flow to the combination of heating device and cooling device; and a plurality of supply lines, each of the plurality of supply lines connected to a combination of heating device and cooling device, which supply lines lead the respective air flow from the combination of heating device and cooling device to the respective environment of a seat, wherein each environment of a seat is assigned to a particular combination of heating device and cooling device, wherein a control device determines the desired temperature of the air flow entering the environment of a seat from the respective supply line, wherein the control device configured to control the cooling device and the heating device assigned to a particular combination of heating device and cooling device in such a manner that the air flow is temperature-controlled to the desired temperature of the air flow to be supplied to the environment of a second seat, wherein a control device is configured to control the central air conditioning device, the cooling device, and the heating device in such a manner that the total energy consumption of the air conditioning system is minimal.

\* \* \* \* \*